United States Patent
Na et al.

(10) Patent No.: US 12,075,040 B2
(45) Date of Patent: *Aug. 27, 2024

(54) FILTERING METHOD AND VIDEO DECODING APPARATUS

(71) Applicant: SK TELECOM CO., LTD., Seoul (KR)

(72) Inventors: Tae Young Na, Seoul (KR); Sun Young Lee, Seoul (KR); Jae Il Kim, Seoul (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/994,189

(22) Filed: Nov. 25, 2022

(65) Prior Publication Data

US 2023/0087432 A1   Mar. 23, 2023

Related U.S. Application Data

(63) Continuation of application No. 17/346,415, filed on Jun. 14, 2021, now Pat. No. 11,546,589, which is a (Continued)

(30) Foreign Application Priority Data

Dec. 13, 2018  (KR) .................. 10-2018-0161235
Nov. 22, 2019  (KR) .................. 10-2019-0151590

(51) Int. Cl.
*H04N 19/119*  (2014.01)
*H04N 19/105*  (2014.01)
(Continued)

(52) U.S. Cl.
CPC ......... *H04N 19/117* (2014.11); *H04N 19/105* (2014.11); *H04N 19/119* (2014.11);
(Continued)

(58) Field of Classification Search
CPC .. H04N 19/105; H04N 19/117; H04N 19/119; H04N 19/159
See application file for complete search history.

(56) References Cited

U.S. PATENT DOCUMENTS 9,210,426 B2    12/2015  Sekiguchi et al.
9,942,572 B2 *   4/2018  Puri ...................... H04N 19/85
(Continued)

FOREIGN PATENT DOCUMENTS

JP    2017-69810 A    4/2017
JP    2018-82498 A    5/2018
(Continued)

OTHER PUBLICATIONS

HEVC Deblocking Filter; Norkin—2012. (Year: 2012).*
(Continued)

*Primary Examiner* — Luis Perez-Fuentes
(74) *Attorney, Agent, or Firm* — Hauptman Ham, LLP

(57) ABSTRACT

A filtering method comprises: determining at least one block boundary to which filtering is to be applied in a reconstructed image; setting a boundary strength of the block boundary based on prediction modes of two target luma blocks forming the block boundary among a plurality of prediction modes, a type of the block boundary and preset conditions; calculating an average value of quantization parameters which are respectively applied to the target luma blocks, and deriving a variable by adding the average value to an offset value derived based on offset information to be encoded at a level of a sequence parameter set that is a header which is referenced in common by the pictures belonging to the sequence; and determining whether to perform the filtering on the block boundary and performing the filtering based on the set boundary strength and the variable.

17 Claims, 13 Drawing Sheets

Related U.S. Application Data continuation of application No. PCT/KR2019/017442, filed on Dec. 11, 2019.

(51) Int. Cl.
*H04N 19/117* (2014.01)
*H04N 19/159* (2014.01)
*H04N 19/176* (2014.01)
*H04N 19/18* (2014.01)
*H04N 19/86* (2014.01)

(52) U.S. Cl.
CPC ......... *H04N 19/159* (2014.11); *H04N 19/176* (2014.11); *H04N 19/18* (2014.11); *H04N 19/86* (2014.11)

(56) References Cited

U.S. PATENT DOCUMENTS

| | | | |
|---|---|---|---|
| 10,306,246 B2* | 5/2019 | Chao | H04N 19/82 |
| 10,778,975 B2* | 9/2020 | Park | H04N 19/159 |
| 10,863,180 B2 | 12/2020 | Sekiguchi et al. | |
| 11,240,493 B2 | 2/2022 | Wang et al. | |
| 11,265,572 B2 | 3/2022 | Chen et al. | |
| 11,546,589 B2* | 1/2023 | Na | H04N 19/157 |
| 2011/0200103 A1 | 8/2011 | Kim et al. | |
| 2014/0369428 A1 | 12/2014 | Park et al. | |
| 2018/0176601 A1 | 6/2018 | Jeong et al. | |
| 2018/0205948 A1 | 7/2018 | Kawamura et al. | |
| 2018/0359484 A1 | 12/2018 | Chen et al. | |
| 2020/0404258 A1 | 12/2020 | Wang et al. | |
| 2021/0266552 A1 | 8/2021 | Kotra et al. | |
| 2022/0014793 A1 | 1/2022 | Wang et al. | |
| 2022/0124314 A1 | 4/2022 | Wang et al. | |
| 2023/0087432 A1* | 3/2023 | Na | H04N 19/119 375/240.29 |
| 2023/0095255 A1* | 3/2023 | Na | H04N 19/176 375/240.29 |
| 2023/0105142 A1* | 4/2023 | Na | H04N 19/105 375/240.29 |

FOREIGN PATENT DOCUMENTS

| | | |
|---|---|---|
| KR | 10-2016-0068288 A | 6/2016 |
| KR | 10-2017-0110557 A | 10/2017 |
| KR | 10-2018-0107778 A | 10/2018 |

OTHER PUBLICATIONS

In-Loop Noise-Filtered Prediction for HEVC; Wige—2014 (Year: 2014).*

Transform-Domain In-Loop Filter with Block Similarity for HEVC; Zhang—2016. (Year: 2016).*

Design of Efficient Streaming Deblocking and SAO Filter for HEVC; Baldev; 2018. (Year: 2018).*

International Search Report dated Mar. 20, 2020 for corresponding International Patent Application No. PCT/KR2019/017442.

Written Opinion dated Mar. 20, 2020 for corresponding International Patent Application No. PCT/KR2019/017442.

Andrey Norkin et al., "HEVC Deblocking Filter", IEEE Transactions on Circuits and Systems for Video Technology, vol. 22, No. 12, Dec. 2012, pp. 1746-1754.

Eugen Wige et al., "In-Loop Noise-Filtered Prediction for High Efficiency Video Coding", IEEE Transactions on Circuits and Systems for Video Technology, vol. 24, No. 7, Jul. 2014, pp. 1142-1155.

Xinfeng Zhang et al., "Transform-Domain In-Loop Filter with Block Similarity for HEVC", VCIP, Nov. 27-30, 2016, 4 pages.

Swamy Baldev et al., "Design and Implementation of Efficient Streaming Deblocking and SAO filter for HEVC Decoder", IEEE Transactions on Consumer Electronics. vol. 64 No. 1, Feb. 2018, pp. 127-135.

Chinese Office Action dated Jun. 30, 2023 for corresponding Chinese Patent Application No. 201980091496.9, 17 pages.

* cited by examiner (a) 32x32 Luma Block  (b) 16x16 Chroma Block (a) TB edge (b) PB and SB edge

| | | | | | | | |
|---|---|---|---|---|---|---|---|
| $p3_0$ | $p2_0$ | $p1_0$ | $p0_0$ | $q0_0$ | $q1_0$ | $q2_0$ | $q3_0$ |
| $p3_1$ | $p2_1$ | $p1_1$ | $p0_1$ | $q0_1$ | $q1_1$ | $q2_1$ | $q3_1$ |
| $p3_2$ | $p2_2$ | $p1_2$ | $p0_2$ | $q0_2$ | $q1_2$ | $q2_2$ | $q3_2$ |
| $p3_3$ | $p2_3$ | $p1_3$ | $p0_3$ | $q0_3$ | $q1_3$ | $q2_3$ | $q3_3$ |
| $p3_4$ | $p2_4$ | $p1_4$ | $p0_4$ | $q0_4$ | $q1_4$ | $q2_4$ | $q3_4$ |
| $p3_5$ | $p2_5$ | $p1_5$ | $p0_5$ | $q0_5$ | $q1_5$ | $q2_5$ | $q3_5$ |
| $p3_6$ | $p2_6$ | $p1_6$ | $p0_6$ | $q0_6$ | $q1_6$ | $q2_6$ | $q3_6$ |
| $p3_7$ | $p2_7$ | $p1_7$ | $p0_7$ | $q0_7$ | $q1_7$ | $q2_7$ | $q3_7$ |

*FIG. 10*

FILTERING METHOD AND VIDEO DECODING APPARATUS

CROSS-REFERENCE TO RELATED APPLICATION

This present application is a continuation of U.S. patent application Ser. No. 17/346,415, filed on Jun. 14, 2021, which is a continuation of PCT/KR2019/017442, filed Dec. 11, 2019, which is based on and claims priority to Korean Patent Application No. 10-2018-0161235 filed on Dec. 13, 2018 and Korean Patent Application No. 10-2019-0151590 filed on Nov. 22, 2019, which are incorporated herein by reference in their entirety.

TECHNICAL FIELD

The present invention relates to encoding and decoding of a video, and more particularly, to a filtering method with improved encoding and decoding efficiency, and a video decoding apparatus.

BACKGROUND

Since the volume of video data is larger than that of voice data or still image data, storing or transmitting video data without processing for compression requires a lot of hardware resources including memory.

Accordingly, in storing or transmitting video data, the video data is generally compressed using an encoder so as to be stored or transmitted. Then, a decoder receives the compressed video data, and decompresses and reproduces the video data. Compression techniques for such video include H.264/AVC and High Efficiency Video Coding (HEVC), which improves coding efficiency over H.264/AVC by about 40%.

However, the video size, resolution, and frame rate are gradually increasing, and accordingly the amount of data to be encoded is also increasing. Accordingly, a new compression technique having better encoding efficiency and higher image quality than the existing compression technique is required.

SUMMARY

Technical Problem

An object of the present invention is to provide an improved image encoding and decoding technology, and more particular, to a technology of improving efficiency of encoding and decoding by filtering an image by selectively applying various conditions according to a type of block boundary.

Technical Solution

According to at least one aspect, the present disclosure provides a filtering method. The method comprises: determining at least one block boundary to which filtering is to be applied in a reconstructed image; setting a boundary strength of the block boundary based on a type of the block boundary and preset conditions; and performing the filtering based on the set boundary strength.

According to another aspect, the present disclosure provides a video decoding apparatus. The apparatus comprises: a boundary determination unit configured to determine at least one block boundary to which filtering is to be applied in a reconstructed image; a strength setting unit configured to set a boundary strength of the block boundary based on a type of the block boundary and preset conditions; and a filtering execution unit configured to perform the filtering based on the set boundary strength.

Advantageous Effects

As described above, according to an embodiment of the present invention, filtering methods for the case where sizes of a coding unit, a prediction unit, a transform unit, etc. are the same or different are proposed.

In addition, according to another embodiment of the present invention, it is possible to improve subjective image quality by removing blocking artifacts occurring between sub-blocks through filtering methods of performing motion compensation for each sub-block.

BRIEF DESCRIPTION OF THE DRAWINGS

FIG. 10 is a diagram for describing a process of determining a filter to be turned on/off.

DETAILED DESCRIPTION

Figure 1:
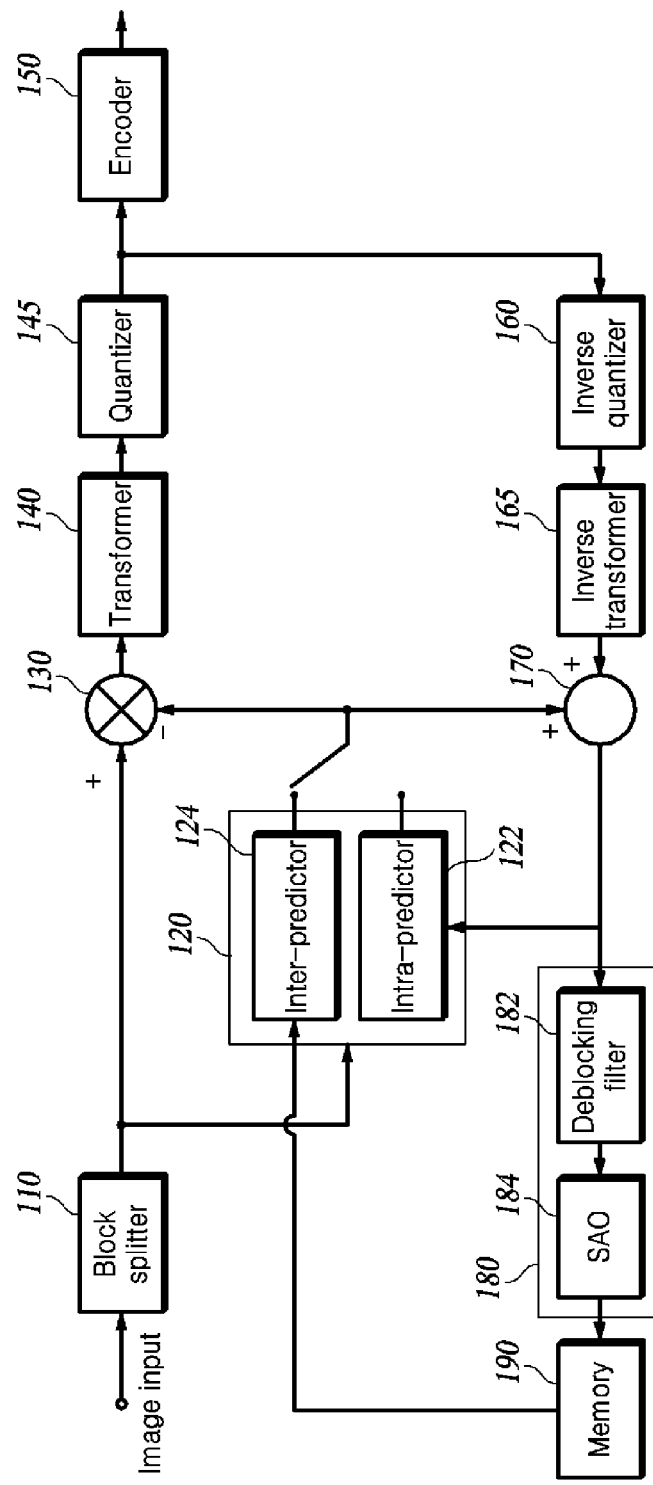
FIG. 1 is an exemplary block diagram of an image encoding apparatus capable of implementing technologies of the present disclosure.

Hereinafter, some embodiments of the present disclosure will be described in detail with reference to the accompanying drawings. It should be noted that, in adding reference numerals to the constituent elements in the respective drawings, like reference numerals designate like elements, although the elements are shown in different drawings. Further, in the following description of the present disclosure, a detailed description of known functions and configurations incorporated herein will be omitted to avoid obscuring the subject matter of the present disclosure.

FIG. 1 is an exemplary block diagram of a video encoding apparatus capable of implementing the techniques of the present disclosure. Hereinafter, a video encoding apparatus and elements of the apparatus will be described with reference to FIG. 1.

The video encoding apparatus includes a block splitter 110, a predictor 120, a subtractor 130, a transformer 140, a quantizer 145, an encoder 150, an inverse quantizer 160, an inverse transformer 165, an adder 170, a filter unit 180, and a memory 190.

Each element of the video encoding apparatus may be implemented in hardware or software, or a combination of hardware and software. The functions of the respective elements may be implemented in software, and a microprocessor may be implemented to execute the software functions corresponding to the respective elements.

One video is composed of a plurality of pictures. Each picture is split into a plurality of regions, and encoding is performed on each region. For example, one picture is split into one or more tiles and/or slices. Here, the one or more tiles may be defined as a tile group. Each tile or slice is split into one or more coding tree units (CTUs). Each CTU is split into one or more coding units (CUs) by a tree structure. Information applied to each CU is encoded as the syntax of the CU, and information applied to CUs included in one CTU in common is encoded as the syntax of the CTU. In addition, information applied to all blocks in one tile in common is encoded as the syntax of the tile or encoded as the syntax of a tile group, which is a collection of multiple tiles, and information applied to all blocks constituting one picture is encoded in a picture parameter set (PPS) or a picture header. Further, information referred to by a plurality of pictures in common is encoded in a sequence parameter set (SPS). In addition, information referred to by one or more SPSs in common is encoded in a video parameter set (VPS).

The block splitter 110 determines the size of a coding tree unit (CTU). Information about the size of the CTU (CTU size) is encoded as the syntax of the SPS or PPS and is transmitted to the video decoding apparatus.

The block splitter 110 splits each picture constituting a video into a plurality of CTUs having a predetermined size, and then recursively splits the CTUs using a tree structure. In the tree structure, a leaf node serves as a coding unit (CU), which is a basic unit of coding.

The tree structure may be a QuadTree (QT), in which a node (or parent node) is split into four sub-nodes (or child nodes) having the same size, a BinaryTree (BT), in which a node is split into two sub-nodes, a TernaryTree (TT), in which a node is split into three sub-nodes at a ratio of 1:2:1, or a structure formed by a combination of two or more of the QT structure, the BT structure, and the TT structure. For example, a QTBT (QuadTree plus BinaryTree) structure or a QTBTTT (QuadTree plus BinaryTree TernaryTree) structure may be used. Here, BTTTs may be collectively referred to as a multiple-type tree (MTT).

Figure 2:
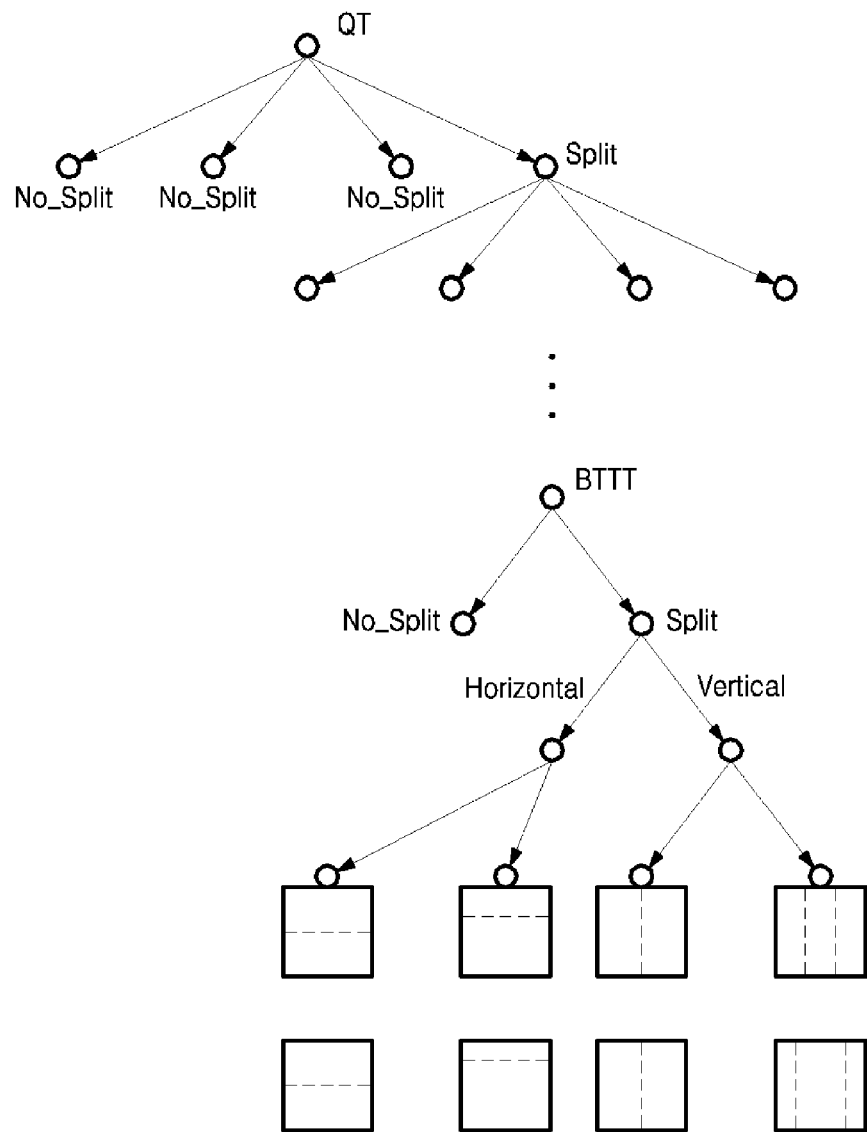
FIG. 2 is a diagram for describing a method of dividing a block using a quad. tree, binary tree, ternery tree (QTBTTT) structure.

FIG. 2 shows a QTBTTT splitting tree structure. As shown in FIG. 2, a CTU may be initially split in the QT structure. The QT splitting may be repeated until the size of the splitting block reaches the minimum block size (MinQTSize) of a leaf node allowed in the QT. A first flag (QT_split_flag) indicating whether each node of the QT structure is split into four nodes of a lower layer is encoded and signaled to the video decoding apparatus by the encoder 150. When the leaf node of the QT is not larger than the maximum block size (MaxBTSize) of the root node allowed in BT, it may be further split in one or more of the BT structure or the TT structure. In the BT structure and/or the TT structure, there may be a plurality of splitting directions. For example, there may be two directions, which are horizontal splitting and vertical splitting of the block of the node. As shown in FIG. 2, when MTT splitting starts, a second flag (mtt_split_flag) indicating whether nodes are split, and a flag indicating a splitting direction (vertical or horizontal), and/ or a flag indicating a splitting type (Binary or Ternary) are encoded and signaled to the video decoding apparatus by the encoder 150.

As another example of the tree structure, when a block is split using the QTBTTT structure, information about a CU split flag (split_cu_flag) indicating that the block has been split and a QT split flag (split_qt_flag) indicating whether the splitting type is QT splitting is encoded and signaled to the video decoding apparatus by the encoder 150. When the value of split_cu_flag indicates that the block has not been split, the block of the node becomes a leaf node in the splitting tree structure and is used as a coding unit (CU), which is a basic unit of encoding. When the value of split_cu_flag indicates that the block has been split, whether the splitting type is QT or MTT is distinguished by the value of split_qt_flag. When the splitting type is QT, there is no additional information. When the splitting type is MTT, a flag (mtt_split_cu_vertical_flag) indicating the MTT splitting direction (vertical or horizontal) and/or a flag (mtt_split_cu_binary_flag) indicating the MTT splitting type (Binary or Ternary) are encoded and signaled to the video decoding apparatus by the encoder 150.

As another example of the tree structure, when QTBT is used, there may be two splitting types, which are horizontal splitting (i.e., symmetric horizontal splitting) and vertical splitting (i.e., symmetric vertical splitting) of a block of a node into two blocks of the same size. A split flag (split_flag) indicating whether each node of the BT structure is split into blocks of a lower layer and split type information indicating the splitting type are encoded and transmitted to the video decoding apparatus by the encoder 150. There may be an additional type, which is splitting a block of a node into two asymmetric blocks. The asymmetric splitting type may include a type of splitting a block into two rectangular blocks at a size ratio of 1:3, and a type of diagonally splitting a block of a node.

CUs may have various sizes according to QTBT or QTBTTT splitting of a CTU. Hereinafter, a block corresponding to a CU (i.e., a leaf node of QTBTTT) to be encoded or decoded is referred to as a "current block."

The predictor 120 predicts a current block to generate a predicted block. The predictor 120 includes an intra-predictor 122 and an inter-predictor 124.

In general, each of the current blocks in a picture may be predictively coded. Prediction of a current block may be performed using the technique of intra-prediction (which is performed based on the data from a picture containing the current block) or the technique of inter-prediction (which is performed based on the data from a picture coded before the picture containing the current block). Inter-prediction includes both unidirectional prediction and bi-directional prediction.

Figure 3:
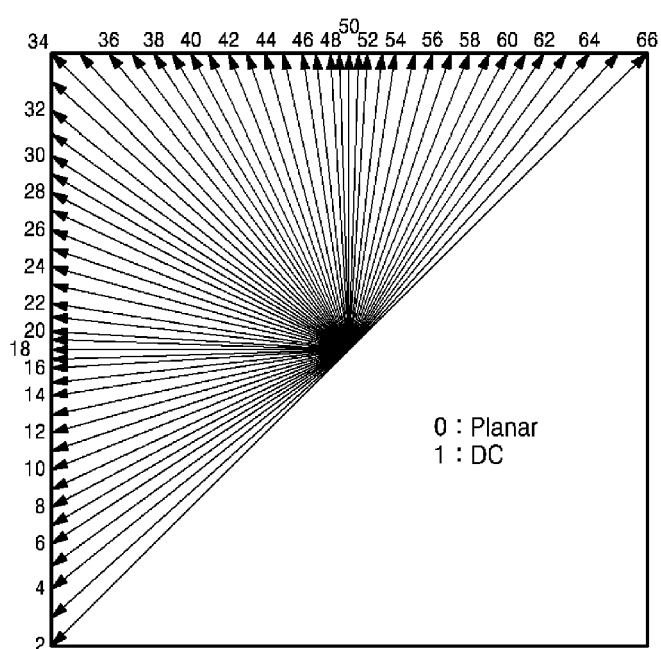
FIG. 3 is a diagram for describing a plurality of intra prediction modes.

The intra-predictor 122 predicts pixels in the current block using pixels (reference pixels) located around the current block in the current picture including the current block. There is a plurality of intra-prediction modes according to the prediction directions. For example, as shown in FIG. 3, the plurality of intra-prediction modes may include non-directional modes, which include a planar mode and a DC mode, and 65 directional modes. Neighboring pixels and an equation to be used are defined differently for each prediction mode.

The intra-predictor 122 may determine an intra-prediction mode to be used in encoding the current block. In some examples, the intra-predictor 122 may encode the current block using several intra-prediction modes and select an appropriate intra-prediction mode to use from the tested modes. For example, the intra-predictor 122 may calculate rate distortion values using rate-distortion analysis of several tested intra-prediction modes, and may select an intra-prediction mode that has the best rate distortion characteristics among the tested modes.

The intra-predictor 122 selects one intra-prediction mode from among the plurality of intra-prediction modes, and predicts the current block using neighboring pixels (reference pixel) and an equation determined according to the selected intra-prediction mode. Information about the selected intra-prediction mode is encoded by the encoder 150 and transmitted to the video decoding apparatus.

The inter-predictor 124 generates a predicted block for the current block through a motion compensation process. The inter-predictor searches for a block most similar to the current block in a reference picture encoded and decoded earlier than the current picture, and generates a predicted block for the current block based on the searched block. Then, the inter-predictor generates a motion vector corresponding to a displacement between the current block in the current picture and the predicted block in the reference picture. In general, motion estimation is performed on a luma component, and a motion vector calculated based on the luma component is used for both the luma component and the chroma component. Motion information including information on the reference picture used to predict the current block and information on the motion vector is encoded and transmitted to the video decoding apparatus by the encoder 150.

The subtractor 130 generates a residual block by subtracting the predicted block generated by the intra-predictor 122 or the inter-predictor 124 from the current block.

The transformer 140 transforms a residual signal in a residual block having pixel values in the spatial domain into a transform coefficient in the frequency domain. The transformer 140 may transform the residual signals in the residual block using the total size of the current block as a transformation unit. Alternatively, the transformer may split the residual block into sub-blocks of a transform region and non-transform region, and transform the residual signals using only the sub-block of the transform region as a transformation unit. Here, the transform region sub-block may be one of two rectangular blocks having a size ratio of 1:1 based on the horizontal axis (or vertical axis). In this case, a flag (cu_sbt_flag) indicating that only the subblock has been transformed, directional (vertical/horizontal) information (cu_sbt_horizontal_flag), and/or location information (cu_sbt_pos_flag) are encoded and signaled to the video decoding apparatus by the encoder 150. In addition, the size of the transform region sub-block may have a size ratio of 1:3 based on the horizontal axis (or vertical axis). In this case, a flag (cu_sbt_quad_flag) for distinguishing the splitting is additionally encoded signaled to the video decoding apparatus by the encoder 150.

The quantizer 145 quantizes transform coefficients output from the transformer 140, and outputs the quantized transform coefficients to the encoder 150.

The encoder 150 generates a bitstream by encoding the quantized transform coefficients using an encoding method such as Context-based Adaptive Binary Arithmetic Code (CABAC). The encoder 150 encodes information such as the CTU size, CU split flag, QT split flag, MTT splitting direction, and MTT splitting type related to block splitting, such that the video decoding apparatus splits the block in the same manner as the video encoding apparatus.

Further, the encoder 150 encodes information about a prediction type indicating whether the current block is encoded by intra-prediction or by inter-prediction, and encodes intra-prediction information (i.e., information about an intra-prediction mode) or inter-prediction information (information about a reference picture and a motion vector) according to the prediction type.

The inverse quantizer 160 inversely quantizes the quantized transform coefficients output from the quantizer 145 to generate transform coefficients. The inverse transformer 165 transforms the transform coefficients output from the inverse quantizer 160 from the frequency domain to the spatial domain and reconstructs the residual block.

The adder 170 adds the reconstructed residual block to the predicted block generated by the predictor 120 to reconstruct the current block. The pixels in the reconstructed current block are used as reference pixels for intra-prediction of the next block.

The filter unit 180 filters the reconstructed pixels to reduce blocking artifacts, ringing artifacts, and blurring artifacts generated due to block-based prediction and transformation/quantization. The filter unit 180 may include a deblocking filter 182 and a sample adaptive offset (SAO) filter 184.

The deblocking filter 180 filters the boundary between the reconstructed blocks to remove blocking artifacts caused by block-by-block encoding/decoding, and the SAO filter 184 additionally filters the deblocking filtered video. The SAO filter 184 is a filter used to compensate for a difference between a reconstructed pixel and an original pixel caused by lossy coding.

The reconstructed blocks filtered through the deblocking filter 182 and the SAO filter 184 are stored in the memory 190. Once all blocks in one picture are reconstructed, the reconstructed picture is used as a reference picture for inter-prediction of blocks in the next picture to be encoded.

Figure 4:
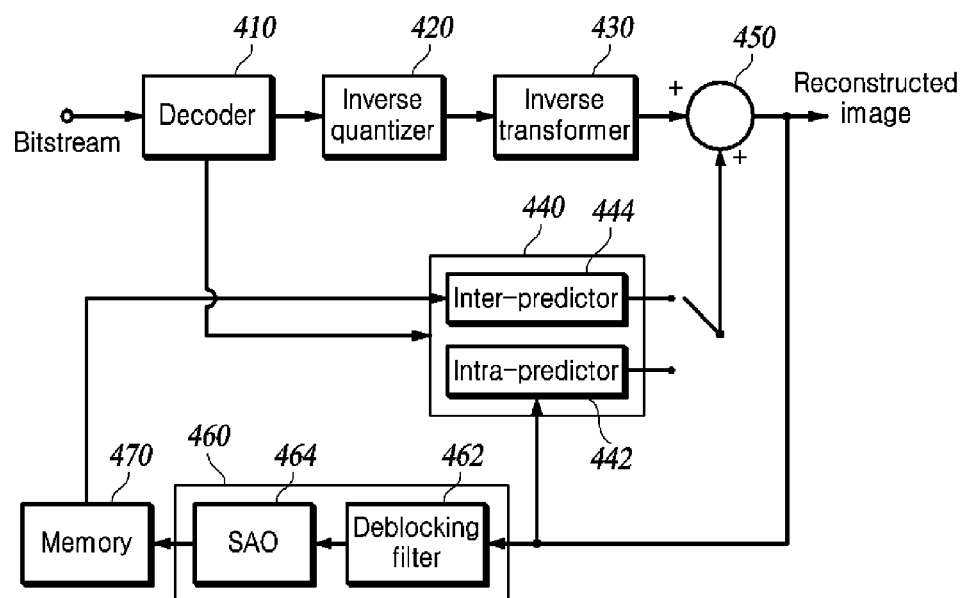
FIG. 4 is an exemplary block diagram of an image encoding apparatus capable of implementing technologies of the present disclosure.

FIG. 4 is an exemplary functional block diagram of a video decoding apparatus capable of implementing the techniques of the present disclosure. Hereinafter, the video decoding apparatus and elements of the apparatus will be described with reference to FIG. 4.

The video decoding apparatus may include a decoder 410, an inverse quantizer 420, an inverse transformer 430, a predictor 440, an adder 450, a filter unit 460, and a memory 470.

Similar to the video encoding apparatus of FIG. 1, each element of the video decoding apparatus may be implemented as hardware or software, or may be implemented as a combination of hardware and software. In addition, the function of each element may be implemented as software, and a microprocessor may be implemented to execute the functions of software corresponding to each element.

The decoder 410 determines a current block to be decoded by decoding the bitstream received from the video encoding apparatus and extracting information related to block splitting, and extracts prediction information and information on residual signals necessary to reconstruct the current block.

The decoder 410 extracts information about the CTU size from the sequence parameter set (SPS) or the picture parameter set (PPS), determines the size of the CTU, and splits a picture into CTUs of the determined size. Then, the decoder determines the CTU as the uppermost layer, that is, the root node of a tree structure, and extracts splitting information about the CTU to split the CTU using the tree structure.

For example, when the CTU is split using the QTBTTT structure, a first flag (QT_split_flag) related to QT splitting is first extracted and each node is split into four nodes of a lower layer. Then, for a node corresponding to the leaf node of QT, a second flag (MTT_split_flag) related to MTT splitting and information on the splitting direction (vertical/horizontal) and/or splitting type (binary/ternary) are extracted, and the leaf node is split in the MTT structure. In this way, each node below the leaf node of the QT is recursively split in a BT or TT structure.

As another example, when a CTU is split using the QTBTTT structure, a CU split flag (split_cu_flag) indicating whether a CU is split is first extracted. If the corresponding block is split, a QT split flag (split_qt_flag) is extracted. When the splitting type is not QT but MTT, a flag (mtt_split_cu_vertical_flag) indicating the MTT splitting direction (vertical or horizontal) and/or a flag (mtt_split_cu_binary_flag) indicating the MTT splitting type (Binary or Ternary) is additionally extracted. In the splitting process, each node may be subjected to recursive QT splitting zero or more times, and then subjected to recursive MTT splitting zero or more times. For example, the CTU may be MTT-split immediately, or may only be QT-split multiple times.

As another example, when the CTU is split using the QTBT structure, the first flag (QT_split_flag) related to the QT spitting, and each node is split into four nodes of a lower layer. For a node corresponding to the leaf node of the QT, the split_flag indicating whether the node is further BT-split and splitting direction information are extracted.

Upon determining the current block to be decoded through tree structure splitting, the decoder 410 extracts information about a prediction type indicating whether the current block is subjected to intra-prediction or inter-prediction. When the prediction type information indicates intra-prediction, the decoder 410 extracts a syntax element for the intra-prediction information (intra-prediction mode) for the current block. When the prediction type information indicates inter-prediction, the decoder 410 extracts a syntax element for the inter-prediction information, that is, information indicating a motion vector and a reference picture referred to by the motion vector.

The decoder 410 extracts information about quantized transform coefficients of the current block as information about residual signals.

The inverse quantizer 420 inversely quantizes the quantized transform coefficients, and inversely transforms the inversely quantized transform coefficients from the frequency domain to the spatial domain to reconstruct residual signals to generate a residual block for the current block.

In addition, when the inverse transformer 430 inversely transforms only a partial region (sub-block) of a transform block, a flag (cu_sbt_flag) indicating that only a sub-block of the transform block has been transformed, and the direction information (vertical/horizontal) about the sub-block (cu_sbt_horizontal_flag) and/or sub-block location information (cu_sbt_pos_flag) are extracted. Then, residual signals are reconstructed by inversely transforming the transform coefficients of the sub-block from the frequency domain to the spatial domain. For the region that is not inversely transformed, the residual signal is filled with "0". Thereby, the final residual block for the current block is created.

The predictor 440 may include an intra-predictor 442 and an inter-predictor 444. The intra-predictor 442 is activated when the prediction type of the current block is intra-prediction, and the inter-predictor 444 is activated when the prediction type of the current block is inter-prediction.

The intra-predictor 442 determines an intra-prediction mode of the current block among a plurality of intra-prediction modes based on a syntax element for the intra-prediction mode extracted from the decoder 410, and predicts the current block based on the reference pixels around the current block according to the intra-prediction mode.

The inter-predictor 444 determines a motion vector of the current block and a reference picture referenced by the motion vector based on the syntax element for the intra-prediction mode extracted from the decoder 410, and predicts the current block based on the motion vector and the reference picture.

The adder 450 reconstructs the current block by adding the residual block output from the inverse transformer and the predicted block output from the inter-predictor or the intra-predictor. The pixels in the reconstructed current block are used as reference pixels for intra-prediction of a block to be decoded later.

The filter unit 460 may include a deblocking filter 462 and an SAO filter 464. The deblocking filter 462 performs deblocking filtering on the boundary between reconstructed blocks to remove blocking artifacts caused by block-by-block decoding. The SAO filter 464 performs additional filtering on a reconstructed block after deblocking filtering in order to compensate for a difference between the reconstructed pixel and the original pixel caused by lossy coding. The reconstructed block filtered through the deblocking filter 462 and the SAO filter 464 is stored in the memory 470. When all blocks in one picture are reconstructed, the reconstructed picture is used as a reference picture for inter-prediction of a block in a picture to be encoded thereafter.

Prior to describing various embodiments of the present invention, a conventional method of applying a deblocking filter to a reconstructed image will be briefly described.

As described above, there are two types of in-loop filters (a deblocking filter and a sample adaptive offset (SAO) filter) in the high efficiency video coding (HEVC) standard. The deblocking filter may perform the following operations to remove a blocking artifact occurring between block boundaries (or edges).

1) Determining block boundary—2) calculating boundary strength (Bs)—3) determining β and tc—4) determining filter to be turned on/off—5) selecting strong/weak filter.

First, an operation of determining the block boundary corresponds to a process of determining a block boundary on which filtering may be performed among block boundaries. The block boundary on which the filtering is to be performed may be determined on the basis of whether a specific boundary is a minimum 8×8 block boundary and corresponds to a boundary of a prediction unit or a transform unit.

Figure 5:
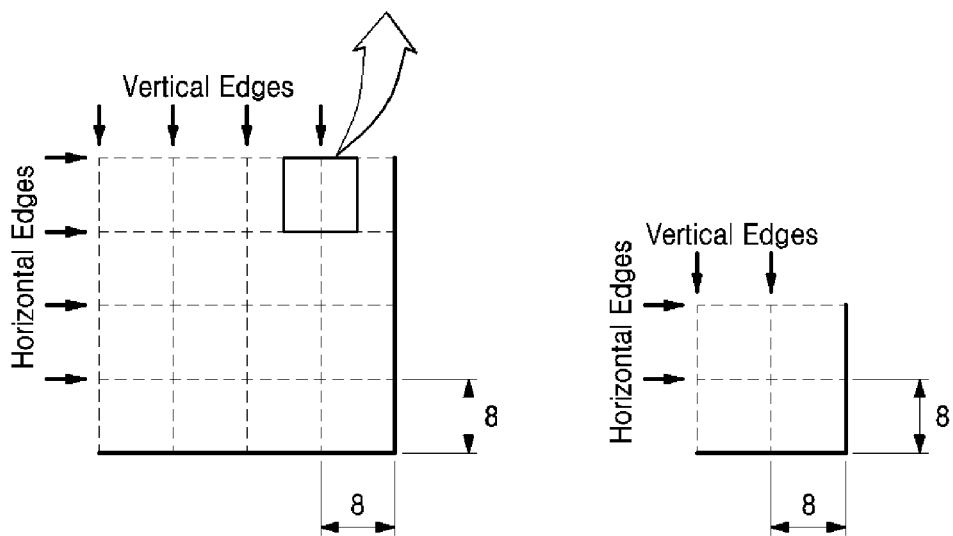
FIGS. 5 and 6 are diagrams for describing a conventional method of applying a deblocking filter.

An example of the block boundary is illustrated in FIG. 5. FIG. 5A illustrates a 32×32 luma block, and FIG. 5B illustrates a 16×16 chroma block. The deblocking filter performs horizontal filtering on an edge in a vertical direction and then performs vertical filtering on an edge in a horizontal direction. When two blocks adjacent to an edge located within a solid tetragon illustrated in FIG. 5A are set as block P and block Q, some pixels adjacent to the boundary of the two blocks may be indexed based on horizontal and vertical axes as illustrated in an upper end of FIG. 5.

An operation of calculating the boundary strength corresponds to a process of calculating a strength of an edge in a horizontal direction and an edge in a vertical direction. As will be described below, in this operation, various conditions are applied to the edge and a boundary strength value is set to either 0, 1 or 2, and therefore the operation may be a process of setting the boundary strength. Here, the boundary strength value "0" means that the filtering is not performed on the corresponding edge.

Figure 6:
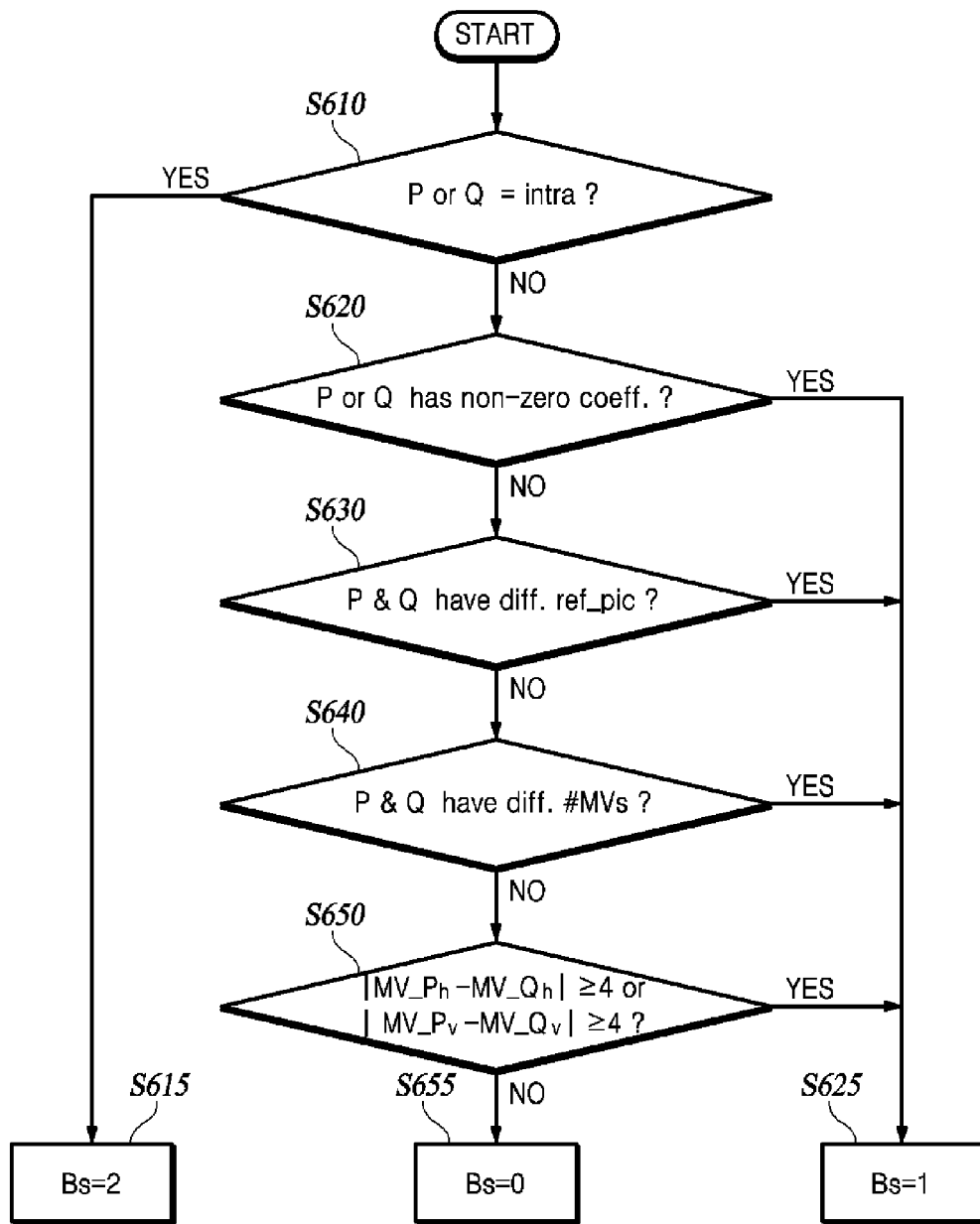

A flowchart for a process of setting the boundary strength is illustrated in FIG. 6. First, it is determined whether a prediction mode of the two blocks P and Q is an intra mode (S610), and when even any one of the two blocks is predicted in the intra mode, the boundary strength is set to "2" (S615). When the prediction modes of the two blocks are not the intra mode (all of the two blocks are predicted in an inter mode), the following processes of setting the boundary strength to "1" or "0" based on whether a discontinuity (deblocking phenomenon) of a pixel value occurs at the edge between the two blocks may be performed.

It is determined whether there are non-zero transform coefficients (non-zero coeff.) in two blocks (S620) to set the boundary strength to "1" when at least one of the two blocks includes the non-zero transform coefficients (S625). When the non-zero transform coefficients are not included in the two blocks, a process S630 of determining whether reference pictures (ref_pic) of the two blocks are different is performed.

When it is determined in process S630 that two blocks refer to different reference pictures, the boundary strength is set to "1" (S625). When it is determined that two blocks refer to the same reference picture, a process S640 of determining whether the two blocks have different numbers of motion vectors (#MVs) may be performed.

When it is determined in process S640 that two blocks have different number of motion vectors, the boundary strength is set to "1" (S625). On the other hand, when it is determined that two blocks use the same number of motion vectors, a process S650 of determining whether a difference in an absolute value |MV_Ph−MV_Qh| between horizontal axis direction components of motion vectors of the two blocks or a difference in an absolute value |MV_Pv−MV_Qv| between vertical axis direction components is 4 or greater is performed. In process S650, when the difference in the absolute value between the horizontal or vertical axis direction components is 4 or greater, the boundary strength is set to "1", and otherwise the boundary strength is set to "0." In the case of the chroma block, the boundary strength calculated at the corresponding position of the luma block is used without change.

When the boundary strength is set, the process of determining two parameters β and tc) used for filtering based on the set boundary strength, the process of determining (determining a filter to be turned on/off) whether to apply filtering to the corresponding edge using the boundary strength and/or β, a process of selecting the strength of the filter to be applied to the corresponding edge among the strong filter and the weak filter, etc. may be performed, thereby implementing the filtering.

As described above, the conventional method sets a boundary strength for an edge to which filtering is applied on the premise that sizes of a coding unit, a prediction unit, and/or a transform unit are different from each other.

On the other hand, the present invention proposes a method of setting the boundary strength for an edge to which the filtering is applied on the premise that the sizes of the coding unit, the prediction unit, and/or the transform unit are equal to each other. That is, according to the present invention, the filtering may be applied only to the boundary of the coding unit (or prediction unit), and the filtering may not be applied to the transform unit. However, the present invention also proposes a processing method of the following exceptional cases.

1) The present invention also proposes a method of setting boundary strength for the exceptional case by processing the case in which the sizes of the coding unit, the prediction unit, and/or the transform unit are different from each other as the exceptional case. For example, the present invention classifies the case in which the coding unit is larger than a size of a transform kernel for the transform unit as the exceptional case in which the sizes of the coding unit, the prediction unit, and/or the transform unit are different from each other, and proposes a processing method therefor. For example, the size of the largest transform kernel is 64×64, but when the size of the coding unit is one of 128×128, 128×64, and 64×128, a plurality of transforms should be applied to one coding unit (multiple times). In this case, the present invention may perform the filtering on the boundary of the transform unit located in the coding unit in addition to the boundary of the coding unit.

2) Furthermore, the present invention treats the case of performing motion compensation for each sub-block located in the coding unit or the prediction unit as the exceptional case, and proposes a filtering method for the exceptional case. The sub-block based motion compensation may include SbTMVP (sub-block-based temporal motion vector prediction, or advanced/alternative temporal motion vector predictor (ATMVP)), bi-directional optical flow (BDOF, or BIO), an affine mode, and the like. The size of the sub-block may vary. However, in the present specification, it is assumed that a minimum size of a sub-block to which the filtering is applied is 8×8. For example, when a 16×16 coding unit is motion-compensated in the unit of 4×4 sub-blocks, it is assumed that the filtering is applied only to sub-block boundaries on 8×8 grid. In this case, sub-blocks within one coding unit may use the same reference picture and may use the same number of motion vectors.

Hereinafter, the filtering method proposed by the present invention will be described.

Figure 7:
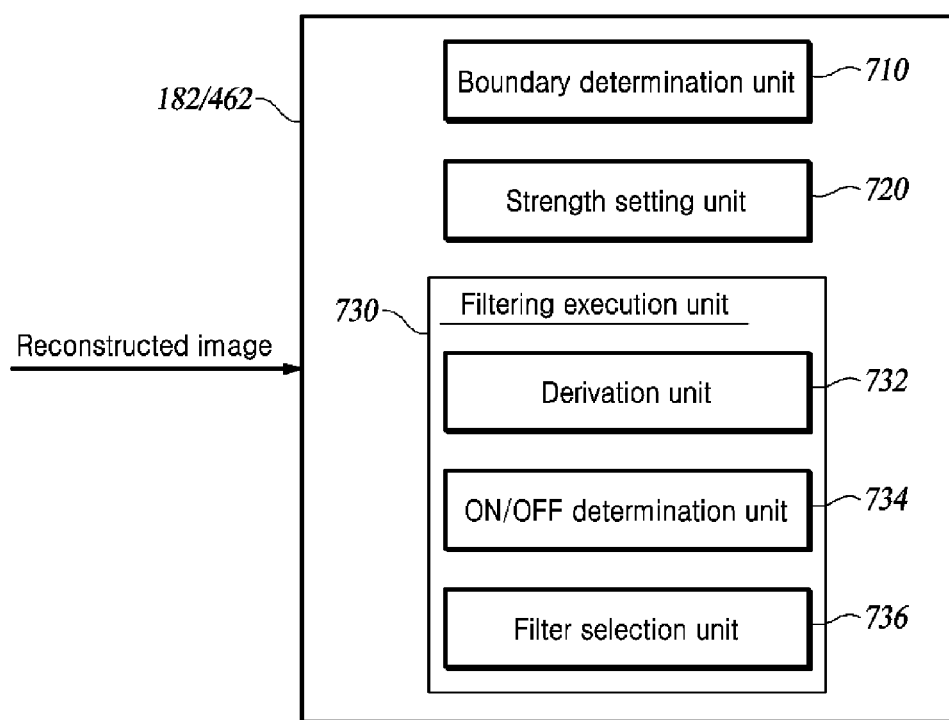
FIG. 7 is an exemplary block diagram of a deblocking filter that may implement the technologies of the present disclosure.
Figure 8:
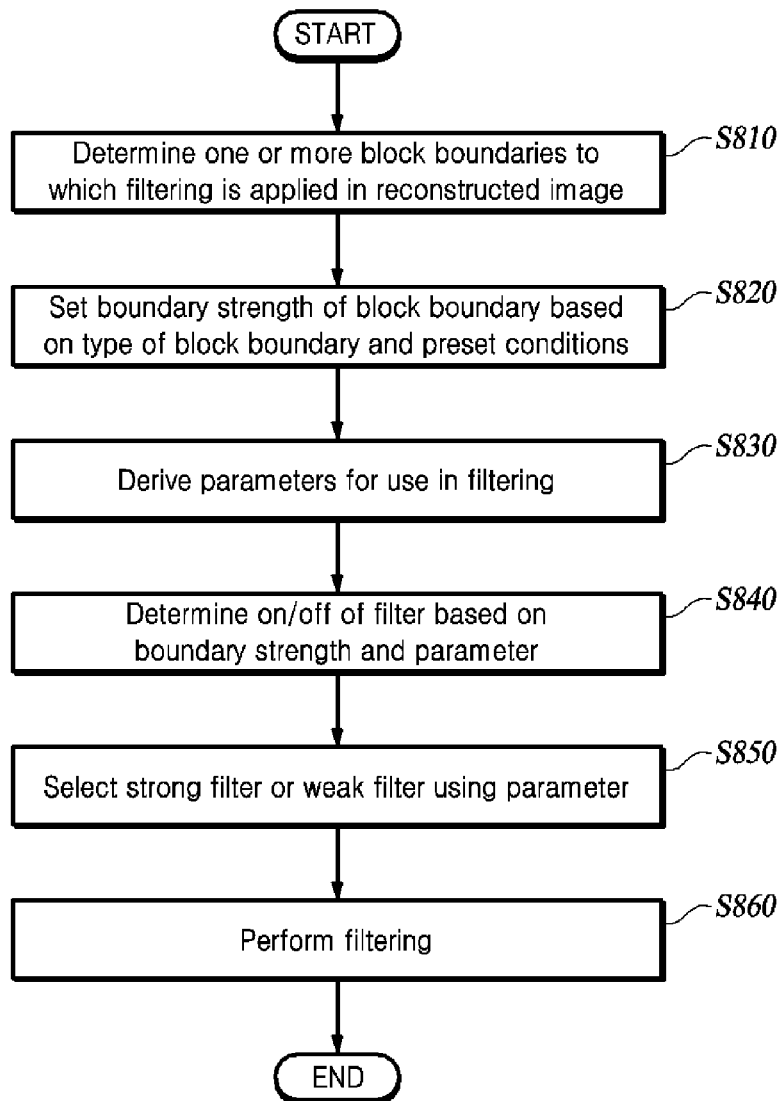
FIG. 8 is a flowchart of a process of performing filtering on a reconstructed image according to an embodiment of the present invention.

As illustrated in FIG. 7, a deblocking filter 182 or 462 that may implement the technologies of the present disclosure may be configured to include a boundary determination unit 710, a strength setting unit 720, and a filtering execution unit 730. In addition, the filtering execution unit 730 may be configured to include a derivation unit 732, an on/off determination unit 734, and a filter selection unit 736.

The boundary setting unit 710 may set a block boundary from a reconstructed image or a coding tree unit (CTU) (S810). The set block boundary may correspond to the boundaries to which the filtering may be applied among boundaries existing in the reconstructed image or the CTU. In the present disclosure, for convenience of description, it is assumed that the minimum size of the block boundary is 8×8.

Block

A type of blocks forming the boundary may be diverse. For example, the blocks may include a coding block, a prediction block, a transform block, a sub-block, a fundamental block, and the like. The prediction block may be the same as the coding block. The fundamental block may be a block unit in which the motion compensation is performed during inter prediction or may be a block unit processed using one intra mode during intra prediction. That is, the fundamental block may be a concept including a prediction block and a sub-block which are units of the motion compensation. Accordingly, the fundamental block may be the prediction block or the sub-block.

Type of Block Boundary

The boundaries existing in the reconstructed image or the CTU may be classified according to the types of adjacent blocks. For example, a boundary formed between adjacent coding blocks may be a coding block boundary CB or a coding block edge, and a boundary formed between adjacent prediction blocks may be a prediction block boundary PB or a prediction block edge. In addition, a boundary formed between adjacent transform blocks, a boundary formed between adjacent sub-blocks, and a boundary formed between adjacent fundamental blocks each may be a transform block boundary (TB, transform block edge), a sub-block block (SB, sub-block edge), and a fundamental block boundary (FB, fundamental block edge).

Figure 9:
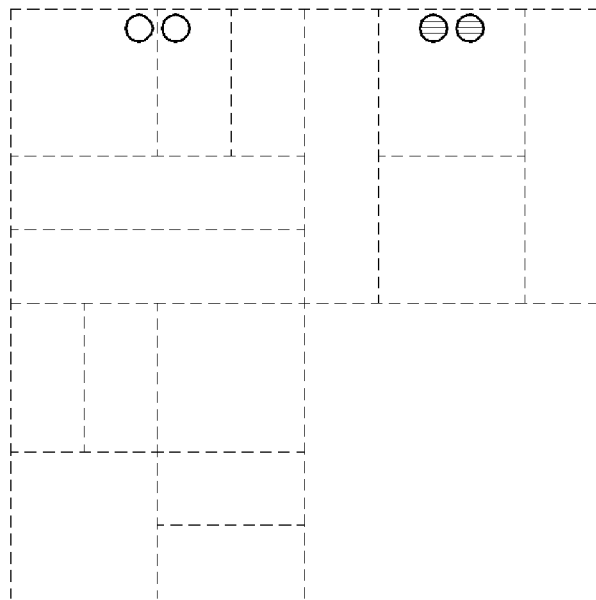
FIG. 9 is a diagram for describing a boundary type of blocks.
Figure 9:
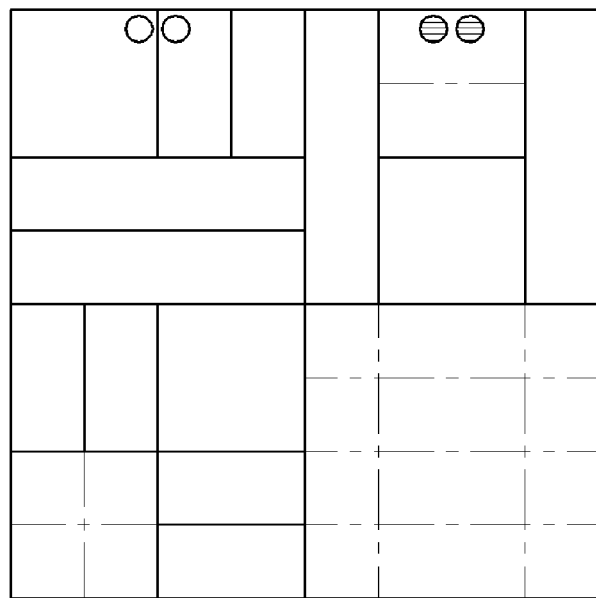

An example of the type of block boundary is illustrated in FIG. 9. FIG. 9 illustrates a form in which one CTU is divided into several coding units. FIG. 9A illustrates the transform block edge (dotted line), and FIG. 9B illustrates the prediction block edge (solid line) and the sub-block edge (dash-dotted line). Since the present invention assumes that the coding unit, the prediction unit, and the transform unit are the same size, it can be seen that the transform block edge and the prediction block edge match.

In FIG. 9, circles without a pattern represent pixels adjacent to the transform block edge and the prediction block edge, and circles with a horizontal pattern represent pixels adjacent to the sub-block edge (edge that does not correspond to the transform block edge and the prediction block edge).

The strength setting unit 720 may set the boundary strength of the block boundary based on the type of block boundaries and the preset conditions described above (S820). That is, the strength setting unit 720 may set the boundary strength of the corresponding edge by applying a type of specific block boundary and the preset conditions to the corresponding edge.

Preset Condition

The preset conditions may correspond to criteria for determining whether a deblocking phenomenon exists in a specific boundary. In addition, the preset conditions may correspond to criteria for determining whether the deblocking phenomenon existing at a specific boundary inherently exists in an original image or has been generated during a quantization process.

The preset conditions may include one or more of the following conditions: a first condition for whether non-zero transform coefficients exist in one or more of the blocks (target blocks) forming the block boundary, a second condition for whether the target blocks have been predicted by referring to different reference pictures or using a different number of motion vectors, a third condition for whether a difference (absolute value) in horizontal axis direction components or a difference (absolute value) in vertical axis direction components between the motion vectors used by the target blocks is greater than or equal to a preset value (for example, "4"), a fourth condition on which the target blocks have been predicted using a different number of motion vectors, and the like.

In addition, the preset conditions may further include a condition based on the prediction modes of the target blocks. For example, the preset conditions may further include whether one or more of the target blocks are predicted in an intra mode, whether a prediction block of block P and a prediction block of block Q among the target blocks are different from each other, whether the target blocks are encoded in an intra block copy (ibc) mode, and the like. According to an embodiment, "whether the prediction mode of the block P and the prediction mode of the block Q are different from each other" may be determined after "whether one or more of the target blocks are predicted in an intra mode." For example, when neither the block P nor the block Q is predicted in the intra mode, when any one of the block P and the block Q is predicted in the ibc mode and the other is predicted in the inter mode, it may be determined that the corresponding condition is satisfied.

When the non-zero transform coefficients are not included in two blocks (target blocks) (that is, when all transform coefficients are zero), the image reconstruction is performed only with a motion compensated value (predicted value), so it is unlikely that discontinuity in a pixel value will occur at an edge. The first condition may correspond to a condition for determining this point.

However, even when the non-zero transform coefficients are not included, the discontinuity in the pixel value may occur when the target blocks are motion-compensated by referring to different reference pictures. Also, when the target blocks use a different number of motion vectors or use different motion vectors, the discontinuity in the pixel value may occur. The second to fourth conditions may correspond to conditions for determining these points.

The strength setting unit 720 may set the boundary strength of the corresponding edge by using one or more of the preset conditions and a type of block boundaries. In addition, the strength setting unit 720 may set the boundary strength of the corresponding edge by using two or more combinations of the preset conditions and the type of block boundaries.

When the boundary strength is set, the filtering execution unit 730 may perform the filtering on the corresponding edge based on the set boundary strength (S830 to S860). The filtering execution unit 730 may perform filtering by performing the above-described "β and tc determination," "filter on/off determination," "strong/weak filter selection," and the like.

First, the derivation unit 732 may use quantization parameters $QP_P$ and $QP_Q$ used in the target blocks to derive a median value for luma ($qP_L$ or an average value for luma) and a median value for chroma ($qP_C$ or an average value for chroma) (S830). This process may be implemented through Equations 1 and 2 below.

$$qP_L = (QP_P + QP_Q + 1) >> 1 \quad \text{[Equation 1]}$$

$$qP_C = (QP_P + QP_Q + 1) >> 1 + cQp\text{PicOffset} \quad \text{[Equation 2]}$$

In Equation 2, $cQ_P$PicOffset is an offset used to adaptively apply a filter to the chroma and may be transmitted to a picture-level header. According to an embodiment, the median value for luma ($qP_L$) may be derived by applying an offset value to a value obtained by averaging the quantization parameters $QP_P$ and $QP_Q$. An embodiment in which the median value for luma is derived by further using the offset value will be described below.

When the median values are derived, the derivation unit 732 may perform a process of calculating a variable Q value for deriving each of the two parameters β and tc (S830). The Q value of deriving the parameter β may be obtained through any one of Equations 3 and 4 below, and the Q value for deriving tc may be obtained through any one of Equations 5 and 6 below.

$$\text{For } \beta: Q = \text{clip3}(0, 51, qP_L + (\text{slice\_beta\_offset\_div2} << 1)) \quad \text{[Equation 3]}$$

$$\text{For } \beta: Q = \text{clip3}(0, 63, qP_L + (\text{slice\_beta\_offset\_div2} << 1)) \quad \text{[Equation 4]}$$

$$\text{For } tc: Q = \text{clip3}(0, 53, qP_L + 2 \times (bS - 1) + (\text{slice\_tc\_offset\_div2} << 1)) \quad \text{[Equation 5]}$$

$$\text{For } tc: Q = \text{clip3}(0, 65, qP_L + 2 \times (bS - 1) + (\text{slice\_tc\_offset\_div2} << 1)) \quad \text{[Equation 6]}$$

In Equations 3 to 6, slice_beta_offset_div2 and slice_tc_offset_div2 are values transmitted through a slice (or a tile or a tile group) header, and bS denotes the boundary strength.

When the Q values are derived, the derivation unit 732 may derive β' and tc' by applying the two Q values to a lookup table (S830). The lookup table may be any one of Tables 1 and 2 below. The Table 2 reflects extension of maximum value of the Q value (Equations 4 and 6).

TABLE 1

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| tc' | 0 | 0 | 0 | 0 | 0 | 0 | 0 | 0 | 0 | 0 | 0 | 0 | 0 | 0 | 0 | 0 | 0 | 0 | 1 |
| β' | 0 | 0 | 0 | 0 | 0 | 0 | 0 | 0 | 0 | 0 | 0 | 0 | 0 | 0 | 0 | 0 | 6 | 7 | 8 |
| Q | 19 | 20 | 21 | 22 | 23 | 24 | 25 | 26 | 27 | 28 | 29 | 30 | 31 | 32 | 33 | 34 | 35 | 36 | 37 |
| tc' | 1 | 1 | 1 | 1 | 1 | 1 | 1 | 1 | 2 | 2 | 2 | 2 | 3 | 3 | 3 | 3 | 4 | 4 | 4 |
| β' | 9 | 10 | 11 | 12 | 13 | 14 | 15 | 16 | 17 | 18 | 20 | 22 | 24 | 26 | 28 | 30 | 32 | 34 | 36 |
| Q | 38 | 39 | 40 | 41 | 42 | 43 | 44 | 45 | 46 | 47 | 48 | 49 | 50 | 51 | 52 | 53 | | | |
| tc' | 5 | 5 | 6 | 6 | 7 | 8 | 9 | 10 | 11 | 13 | 14 | 16 | 18 | 20 | 22 | 24 | | | |
| β' | 38 | 40 | 42 | 44 | 46 | 48 | 50 | 52 | 54 | 56 | 58 | 60 | 62 | 64 | — | — | | | |

TABLE 2

| Q | 0 | 1 | 2 | 3 | 4 | 5 | 6 | 7 | 8 | 9 | 10 | 11 | 12 | 13 | 14 | 15 | 16 | 17 | 18 |
|---|---|---|---|---|---|---|---|---|---|---|----|----|----|----|----|----|----|----|----|
| tc' | 0 | 0 | 0 | 0 | 0 | 0 | 0 | 0 | 0 | 0 | 0 | 0 | 0 | 0 | 0 | 0 | 0 | 0 | 1 |
| β' | 0 | 0 | 0 | 0 | 0 | 0 | 0 | 0 | 0 | 0 | 0 | 0 | 0 | 0 | 0 | 0 | 6 | 7 | 8 |
| Q | 19 | 20 | 21 | 22 | 23 | 24 | 25 | 26 | 27 | 28 | 29 | 30 | 31 | 32 | 33 | 34 | 35 | 36 | 37 |
| tc' | 1 | 1 | 1 | 1 | 1 | 1 | 1 | 1 | 2 | 2 | 2 | 2 | 3 | 3 | 3 | 3 | 4 | 4 | 4 |
| β' | 9 | 10 | 11 | 12 | 13 | 14 | 15 | 16 | 17 | 18 | 20 | 22 | 24 | 26 | 28 | 30 | 32 | 34 | 36 |
| Q | 38 | 39 | 40 | 41 | 42 | 43 | 44 | 45 | 46 | 47 | 48 | 49 | 50 | 51 | 52 | 53 | 54 | 55 | 56 |
| tc' | 5 | 5 | 6 | 6 | 7 | 8 | 9 | 10 | 11 | 13 | 14 | 16 | 18 | 20 | 22 | 25 | 28 | 31 | 35 |
| β' | 38 | 40 | 42 | 44 | 46 | 48 | 50 | 52 | 54 | 56 | 58 | 60 | 62 | 64 | 66 | 68 | 70 | 72 | 74 |
| Q | | 57 | | 58 | | 59 | | 60 | | 61 | | 62 | | 63 | | 64 | | 65 | |
| tc' | | 39 | | 44 | | 50 | | 56 | | 63 | | 70 | | 79 | | 88 | | 99 | |
| β' | | 76 | | 78 | | 80 | | 82 | | 84 | | 85 | | 88 | | — | | — | |

When β' and tc' are derived, the derivation unit 732 may derive two parameters β and tc by applying bit-depth to the values of β' and tc' (S830). This process may be implemented through Equations 7 and 8 below.

$$tc = tc' \times (1 << (BitDepthY - 8))$$ [Equation 7]

$$\beta = \beta' \times (1 << (BitDepthY - 8))$$ [Equation 8]

The on/off determination unit 734 may determine whether to apply the filter to the corresponding edge (on/off) based on the parameters derived from the derivation unit 732 and the boundary strength (S840). Whether to apply the filter to the luma block may be determined by the unit of four lines among lines consisting of pixels included in the target blocks.

For example, as illustrated in FIG. 10, when pixels included in the target blocks (block P and block Q) having an 8×8 size are expressed, a total of eight pixel lines may be determined in the vertical axis direction. The on/off determination unit 734 may determine whether to apply the filter from the $0^{th}$ line to the $3^{rd}$ line (box represented by a dashed-dotted line) and may determine whether to apply the filter from the $4^{th}$ line to the $7^{th}$ line (box represented by a solid line).

Equations for determining whether to apply the filter are as shown in Equations 9 and 10 below. Equation 9 is an equation for determining whether to apply the filter from the $0^{th}$ line to the $3^{rd}$ line, and Equation 10 is an equation for determining whether to apply the filter from the $4^{th}$ line to the $7^{th}$ line. When both conditions required in Equations 9 and 10 are satisfied, the filter is applied to the corresponding edge.

$$bS(\text{luma}) > 0,$$

$$d_0 + d_3 < \beta \text{ where } d_i = |p2_i - 2*p1_i + p0_i| + |q2_i - 2*q1_i + q0_i|$$ [Equation 9]

$$bS(\text{luma}) > 0,$$

$$d_4 + d_7 < \beta \text{ where } d_i = |p2_i - 2*p1_i + p0_i| + |q2_i - 2*q1_i + q0_i|$$ [Equation 10]

It may be determined whether to apply the filter to the chroma block based on the boundary strength value. When the boundary strength value exceeds one, the filtering may be performed on the edge of the corresponding chroma block. That is, in the case of the chroma block, the filter is applied only when one or more of the target blocks are encoded in the intra mode.

When it is determined whether to apply the filter, the filter selection unit 736 may select either a strong filter or a weak filter (S860). The selection of the strong filter or the weak filter may also be determined for each of the four pixel lines illustrated in FIG. 10. Equations for determining the strength and weakness of the filter are shown in Equations 11 and 12 below. Equation 11 is applied to the $0^{th}$ line to the $3^{rd}$ line, and Equation 12 is applied to the $4^{th}$ line to the $7^{th}$ line. When all three conditions required in Equations 11 and 12 are satisfied, the strong filter is applied to the corresponding edge, and in other cases, the weak filter is applied. There is only one filter for the chroma block.

$$2d_i<(\beta>>2),$$

$$|p3_i-p0_i|+|q3_i-q0_i|<(\beta>>3),$$

$$|p0_i-q0_i|<((5*tc+1)>>1) \quad \text{[Equation11]}$$

$$2d_i<(\beta>>2),$$

$$|p3_i-p0_i|+|q3_i-q0_i|<(\beta>>3),$$

$$|p0_i-q0_i|<((5*tc+1)>>1) \quad \text{[Equation 12]}$$

Whether or not to apply the filter and the type of filter are determined through the above processes. In this case, the filtering execution unit 730 may apply the filtering to the corresponding edge (S860). When the strong filtering is applied to the luma block, three pixels (total of six pixels) adjacent to the boundary of the target blocks may be filtered, and when the weak filtering is applied, two pixels (total of four pixels) adjacent to the boundary may be filtered. In the case of the chroma block, since there is only one type of filter, two pixels (a total of four pixels) adjacent to the boundary may be filtered.

Hereinafter, various embodiments proposed by the present invention will be described in detail.

First Embodiment

A first embodiment relates to a method of setting boundary strength by applying preset conditions to a transform block boundary and a fundamental block boundary.

Figure 11:
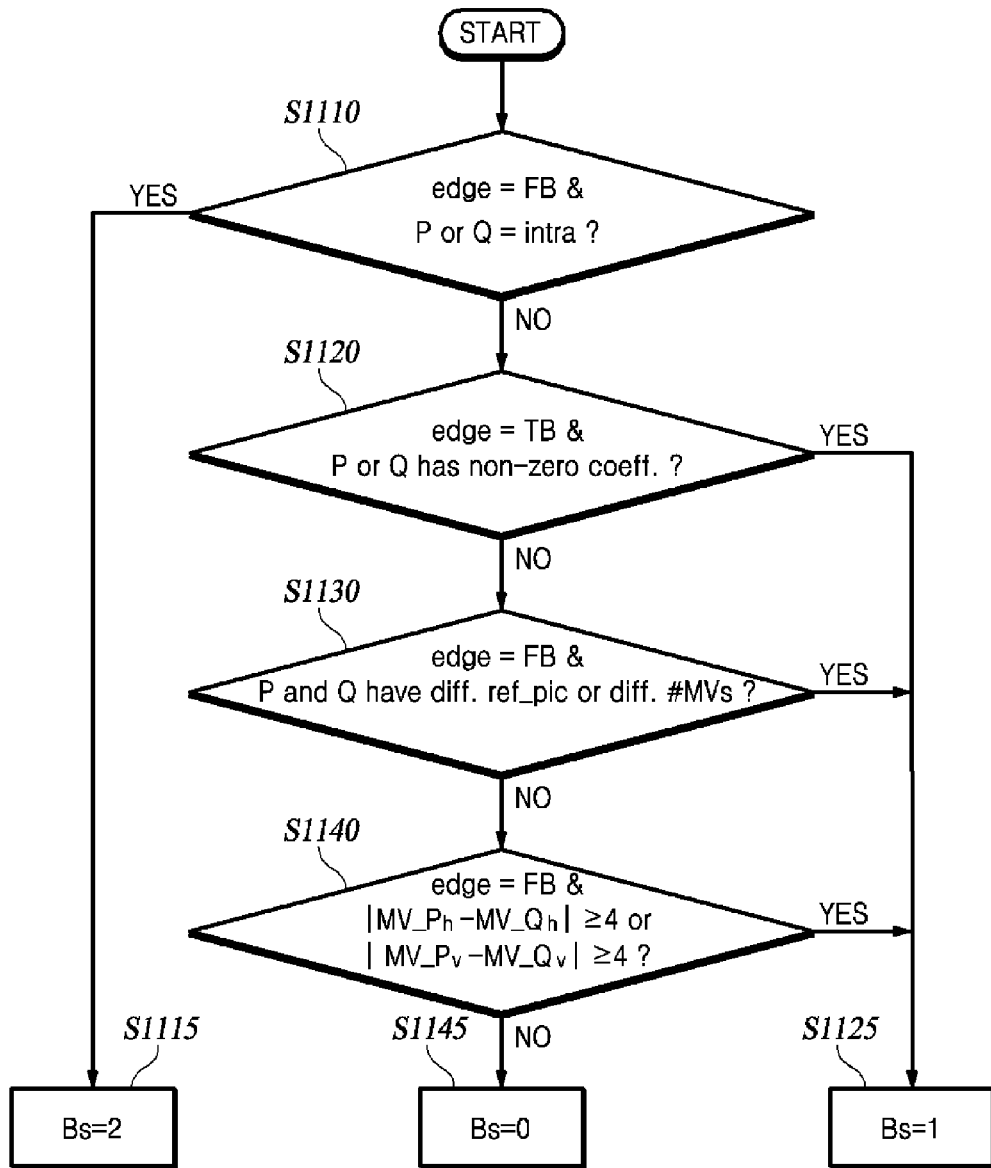
FIGS. 11 to 13 are flowcharts of a process of setting boundary strength for block boundaries according to various embodiments of the present invention.

As illustrated in FIG. 11, when the block boundary corresponds to the transform block boundary TB and the target blocks forming the transform block boundary TB satisfy the first condition (non-zero transform coefficients are present in one or more of the target blocks) (S1120), a video encoding/decoding apparatus may set the boundary strength to a first value (for example, "1") (S1125).

In addition, when the block boundary corresponds to the fundamental block boundary FB and the target blocks forming the fundamental block boundary PB satisfy the second condition (the target blocks have been predicted by referring to different reference pictures or using a different number of motion vectors) (S1130), the video encoding/decoding apparatus may set the boundary strength to the first value (S1125).

Furthermore, when the block boundary corresponds to the fundamental block boundary FB and the target blocks forming the fundamental block boundary PB satisfy the third condition (the difference in the horizontal axis direction component or the difference in the vertical axis direction component between the motion vectors used by the target blocks is greater than or equal to a preset value) (S1140), the video encoding/decoding apparatus may set the boundary strength to the first value (S1125).

The video encoding/decoding apparatus sequentially determines processes S1120 to S1130, and when it is determined that all processes are not satisfied, may set the boundary strength to a zero value (for example, "0") (S1145). In this case, the filtering may not be applied to the corresponding edge.

According to an embodiment, the video encoding/decoding apparatus may determine whether the block boundary corresponds to the fundamental block boundary FB and whether the target blocks forming the fundamental block boundary FB satisfy a fifth condition (at least one of the target blocks is predicted in the intra mode) (S1110). When it is determined that the fifth condition is satisfied, the video encoding/decoding apparatus may set the boundary strength to a second value (for example, "2") (S1115). The video encoding/decoding apparatus may perform processes S1120 to S1140 when it is determined that the fifth condition is not satisfied.

In connection with the sub-block boundary SB included in the boundary FB of the fundamental block, the target blocks forming the sub-block boundary SB may refer to different reference pictures or the same reference pictures. Since it is determined at S1130 whether the second condition (target blocks refer to different reference pictures) is satisfied, all cases in which the target blocks refer to different reference pictures or refer to the same reference picture may be processed.

In the first embodiment, by determining the fundamental block boundary FB, the prediction block boundary PB and the sub-block boundary SB may be determined at once. Therefore, the first embodiment may simplify the process of setting the boundary strength.

Second Embodiment

A second embodiment relates to a method of setting the boundary strength by applying preset conditions to the transform block boundary TB, the prediction block boundary PB, and the sub-block boundary SB. That is, the second embodiment relates to a method of determining the boundary strength by classifying the fundamental block boundary PB of the first embodiment into a prediction block boundary PB and a sub-block boundary SB.

Figure 12:
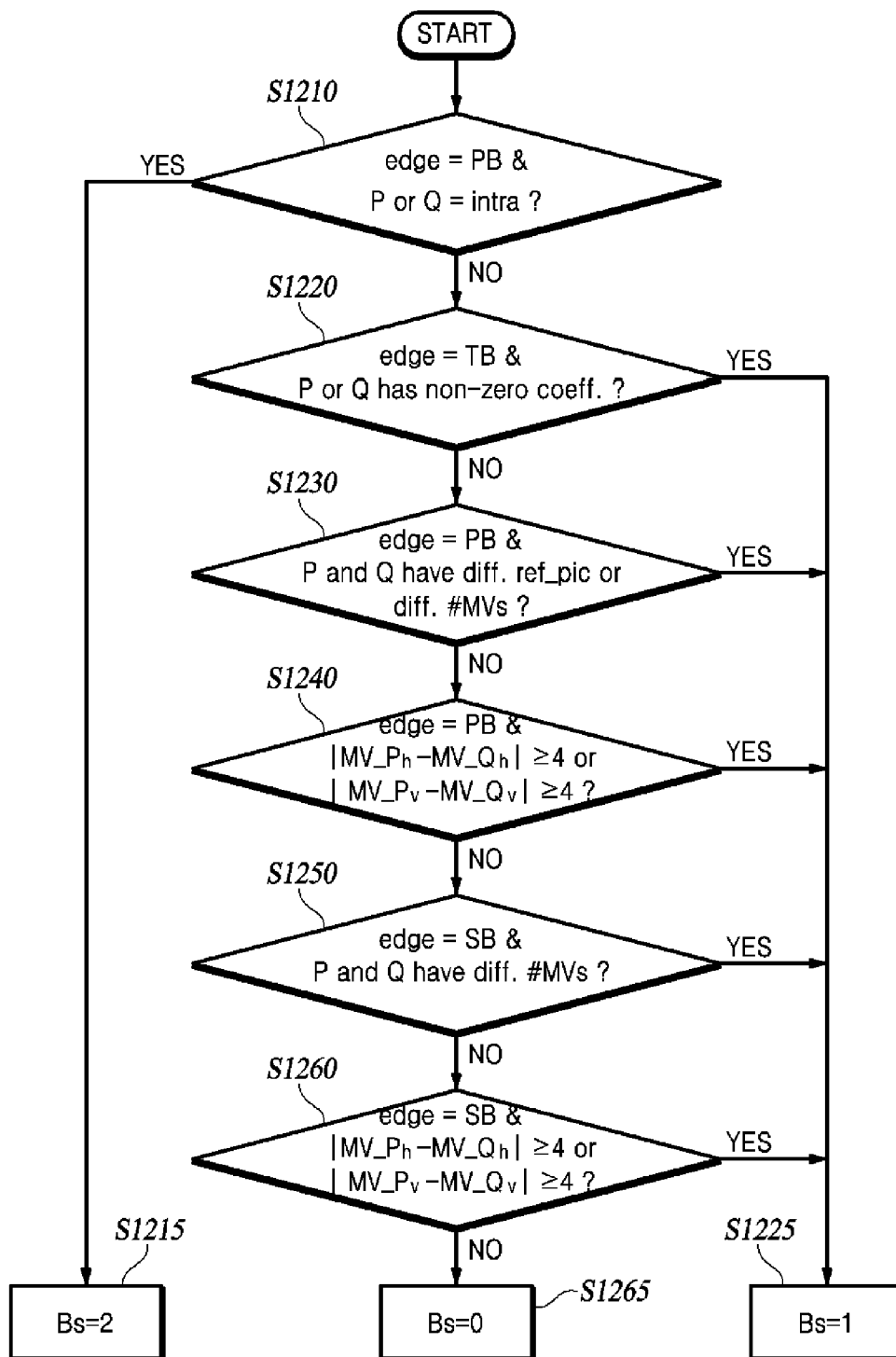

As illustrated in FIG. 12, when the block boundary corresponds to the transform block boundary TB and the target blocks forming the transform block boundary TB satisfy the first condition (the non-zero transform coefficients are present in one or more of the target blocks) (S1220), the video encoding/decoding apparatus may set the boundary strength to a first value (S1225).

In addition, when the block boundary corresponds to the prediction block boundary PB and the target blocks forming the prediction block boundary PB satisfy the second condition (the target blocks have been predicted by referring to different reference pictures or using a different number of motion vectors) (S1230), the video encoding/decoding apparatus may set the boundary strength to the first value (S1225).

In addition, when the block boundary corresponds to the prediction block boundary PB and the target blocks forming the prediction block boundary PB satisfy the third condition (the difference in the horizontal axis direction component or the difference in the vertical axis direction component between the motion vectors used by the target blocks is greater than or equal to a preset value) (S1240), the video encoding/decoding apparatus may set the boundary strength to the first value (S1225).

In addition, when the block boundary corresponds to the sub-block boundary SB and the target blocks forming the sub-block boundary SB satisfy the fourth condition (the target blocks have been predicted by using a different number of motion vectors) (S1250), the video encoding/decoding apparatus may set the boundary strength to the first value (S1225).

In addition, when the block boundary corresponds to the sub-block boundary SB and the target blocks forming the sub-block boundary SB satisfy the third condition (S1260), the video encoding/decoding apparatus may set the boundary strength to the first value (S1225).

The video encoding/decoding apparatus sequentially determines processes S1220 to S1260, and when it is determined that all the processes are not satisfied, may set the boundary strength to a 0 value (S1265). In this case, the filtering may not be applied to the corresponding edge.

According to an embodiment, the video encoding/decoding apparatus may determine whether the block boundary corresponds to the prediction block boundary PB and the target blocks forming the prediction block boundary PB satisfy the fifth condition (at least one of the target blocks is predicted in the intra mode) (S1210). When it is determined that the fifth condition is satisfied, the video encoding/decoding apparatus may set the boundary strength to a second value (S1215). The video encoding/decoding apparatus may perform processes S1220 to S1260 when it is determined that the fifth condition is not satisfied.

In the second embodiment, in the case of the prediction block boundary PB, it is determined whether the second condition (target blocks refer to different reference pictures) is satisfied, but in the case of the sub-block boundary SB, it is not determined whether the second condition is satisfied. Therefore, in the second embodiment, the reference pictures of the target blocks forming the prediction block boundary PB may be different from each other, but reference pictures of the target blocks forming the sub-block boundary SB may be the same.

Third Embodiment

A third embodiment relates to a method of setting the boundary strength for the boundary (sub-block boundary SB) of sub-blocks to which a transform process is not applied.

After the sub-blocks existing in the coding block or the prediction block are motion compensated, the patterns of these sub-blocks may be combined through the transform process. However, when the sub-blocks do not go through the transform process, the prediction pattern of the sub-blocks is maintained without change so that the deblocking phenomenon between the sub-block boundaries SBs may occur or be emphasized. According to the third embodiment, the present invention proposes a method of applying filtering to a sub-block boundary SB by setting boundary strength for the sub-block boundary SB to which a transform process is not applied.

Cases that the transform process is not applied are as follows: a transform skip mode in which the transform process is skipped, a trans-quant bypass mode in which all transform and quantization processes are skipped, a skip mode in which the transform and quantization processes are all skipped because the transform coefficients are all zero, and the like.

Figure 13:
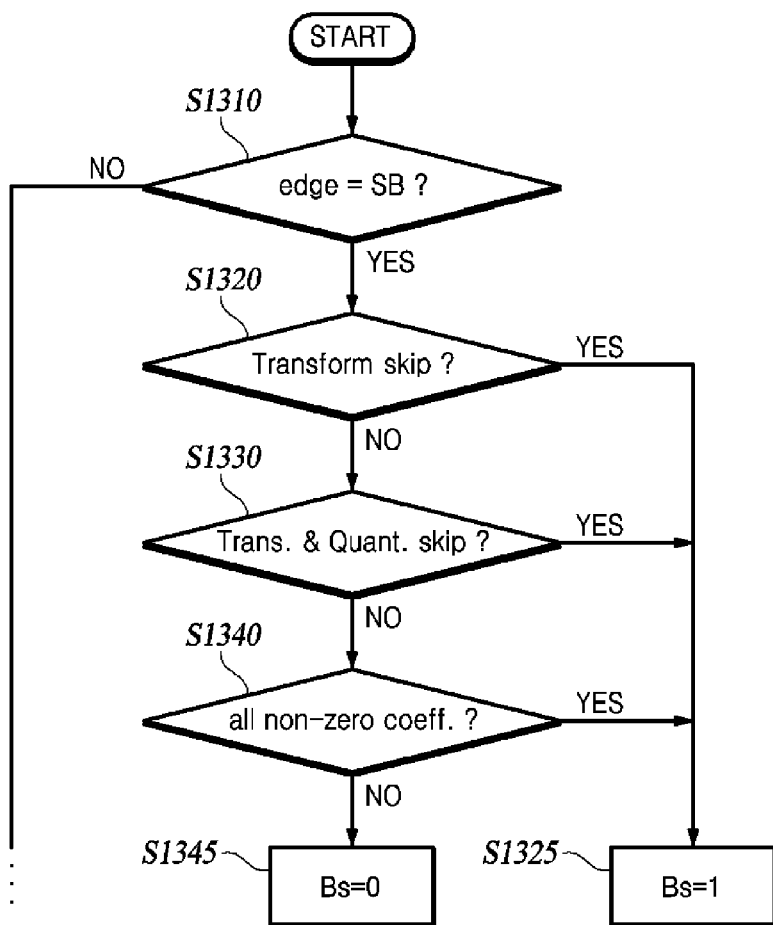

As illustrated in FIG. 13, the video encoding/decoding apparatus may determine whether the corresponding edge corresponds to the sub-block boundary SB (S1310). When the corresponding edge corresponds to the sub-block boundary SB, the video encoding/decoding apparatus may determine whether the transform process is applied to the target blocks (S1320 to S1340).

Specifically, the video encoding/decoding apparatus may determine at least one of whether the transform skip mode is applied to the target blocks (S1320), whether the trans-quant bypass mode is applied to the target blocks (S1330), and whether the skip mode is applied to the target blocks (S1340) to determine whether the transform process is applied to the target blocks.

When it is determined that the transform process is not applied to the target blocks, the video encoding/decoding apparatus may set the boundary strength of the corresponding edge to the first value in order to reduce the deblocking phenomenon (S1325). On the other hand, when it is determined that the transform process is applied to the target blocks, the video encoding/decoding apparatus may set the boundary strength of the corresponding edge to the zero value (S1345).

At process S1320, the information (for example, transform_skip_flag) indicating whether to apply the transform skip mode may be used. If transform_skip_flag=1, it may mean that the transform skip mode is applied (the transform process is skipped), and if transform_skip_flag=0, it may mean that the transform skip mode is not applied (the transform process is not skipped)

Process S1330 may be performed using the information (for example, cu_transquant_bypass_flag) indicating whether to apply the trans-quant bypass mode. If cu_transquant_bypass_flag=1, it may mean that the trans-quant bypass mode is applied (transform and quantization processes are skipped), and if cu_transquant_bypass_flag=0, it may mean that trans-quant bypass mode is not applied (transform and quantization processes are not skipped).

Process S1340 may be performed using the information (for example, cbf) indicating whether to apply the skip mode. If cbf=1, it may mean that the skip mode is not applied (transform and quantization process is not skipped), and if cbf=0, it may mean that the skip mode is applied (transform and quantization process are skipped).

Fourth Embodiment

A fourth embodiment relates to a method of deriving a median value ($qP_L$) for luma by applying an offset value.

As described above, the luma median value $qP_L$ may be derived by averaging the quantization parameters $QP_P$ and $QP_Q$ of the target blocks. According to an embodiment (according to a fourth embodiment), the median value for luma may be derived by applying an offset value (offset information) to the value obtained by averaging quantization parameters of target blocks. The offset value corresponds to information or a value for adaptively adjusting the filter strength by adjusting the median value for luma.

The equation for applying the offset value to the average value of the quantization parameters is as shown in Equation 13 below.

$$qP=((Qp_Q+Qp_P+1)>>1)+qp\text{Offset} \qquad \text{[Equation 13]}$$

In Equation 13 above, qP denotes a median value for luma, and qpOffset denotes an offset value. The offset value may be transmitted in one or more locations of a picture-level header, a sequence-level header, a tile group header, and a tile header.

According to an embodiment, the video encoding/decoding apparatus may derive the median value for luma by applying the offset value to the average value of the quantization parameters without considering other conditions or derive the median value for luma by applying the offset value to the average value of quantization parameters when other conditions are satisfied.

As an example of considering other conditions, the video encoding/decoding apparatus may derive the median value for luma by applying the offset value to the average value of the quantization parameters when the luma level of the target blocks exceeds or is greater than or equal to a threshold value. The luma level may correspond to the average value of the pixel values included in the target blocks. For example, the luma level may correspond to an average value of one or more pixels included in the $0^{th}$ pixel line and one or more pixels included in the $3^{rd}$ pixel line. The information on the threshold value to be compared with the luma level may be transmitted in one or more locations of the picture-level header, the sequence-level header, the tile group header, and the tile header.

Although exemplary embodiments have been described for illustrative purposes, those skilled in the art will appreciate that and various modifications and changes are possible, without departing from the idea and scope of the embodiments. Exemplary embodiments have been described for the sake of brevity and clarity. Accordingly, one of ordinary skill would understand that the scope of the embodiments is not limited by the embodiments explicitly described above but is inclusive of the claims and equivalents thereto.

The invention claimed is:

1. A filtering method, performed by a video encoding apparatus of encoding a sequence of pictures, for filtering block boundaries between reconstructed luma blocks, the method comprising:
   determining at least one block boundary to which filtering is to be applied in a reconstructed image;
   setting a boundary strength of the block boundary based on prediction modes of two target luma blocks forming the block boundary among a plurality of prediction modes, wherein the plurality of prediction modes include an intra prediction mode, an intra block copy mode, and an inter prediction mode;
   calculating an average value of quantization parameters which are respectively applied to the target luma blocks, and deriving a variable by adding the average value to an offset value derived based on offset information to be encoded at a picture-level header or a sequence-level header that is a header which is referenced in common by the pictures belonging to the sequence; and
   determining whether to perform the filtering on the block boundary and performing the filtering, based on the set boundary strength and the variable,
   wherein the setting of the boundary strength comprises:
      if at least one of the two target luma blocks are predicted by the intra prediction mode, setting the boundary strength as a second value; and
      otherwise, if one of the two target luma blocks is predicted by the intra block copy mode and the other of the two target luma blocks is predicted by the inter prediction mode, setting the boundary strength as a first value different from the second value.

2. The filtering method of claim 1, wherein the boundary strength of the block boundary is set further considering preset conditions including:
   a first condition that non-zero transform coefficients exist in one or more of target luma blocks forming the block boundary;
   a second condition that the target luma blocks are predicted by referring to different reference pictures or using a different number of motion vectors; and
   a third condition that a difference in a horizontal axis direction component or a difference in a vertical axis direction component between the motion vectors used by the target luma blocks is greater than or equal to a preset threshold value,
   wherein, when both of the two target luma blocks are not predicted by the intra prediction mode, the boundary strength is set to the first value if at least one of the preset conditions is satisfied.

3. The filtering method of claim 2, wherein a type of the block boundary includes a transform block boundary and a fundamental block boundary, and
   wherein the setting of the boundary strength comprises setting the boundary strength to the first value, when the block boundary corresponds to the transform block boundary and the target luma block satisfies the first condition, or when the block boundary corresponds to the fundamental block boundary and the target luma block satisfies the second condition or the third condition.

4. The filtering method of claim 2, wherein the preset conditions further include a fourth condition that the target luma blocks are predicted using the different number of motion vectors,
   wherein a type of the block boundary includes a transform block boundary, a prediction block boundary, and a sub-block boundary, and
   wherein the setting of the boundary strength comprises setting the boundary strength to the first value, when the block boundary corresponds to the transform block boundary and the target luma block satisfies the first condition, or when the block boundary corresponds to the prediction block boundary and the target luma block satisfies the second condition or the third condition, or when the block boundary corresponds to the sub-block boundary and the target luma block satisfies the third condition or the fourth condition.

5. The filtering method of claim 2, wherein a type of the block boundary includes a sub-block boundary,
   wherein the preset conditions include a fifth condition that a transform process is not applied to target luma blocks forming the block boundary, and
   wherein the setting of the boundary strength comprises setting the boundary strength to the first value, when the block boundary corresponds to the sub-block boundary and the target luma block satisfies the fifth condition.

6. The filtering method of claim 1, further comprising:
   deriving a luma level by averaging values of a plurality of pixels included in the target luma blocks,
   wherein the offset value is determined based on the luma level and at least one threshold which is determined at the level of the sequence parameter set.

7. The filtering method of claim 1, wherein the type of the block boundary includes a sub-block boundary, and
   wherein the setting of the boundary strength comprises setting the boundary strength to the first value when the block boundary corresponds to the sub-block boundary and the prediction modes of the target luma blocks are the IBC mode.

8. The filtering method of claim 1, wherein determining whether to perform the filtering on the block boundary and performing the filtering comprises:

deriving a first parameter for the filtering based on adding the variable to a first offset determined at a slice level;

deriving a second parameter for the filtering based on adding the variable to a second offset determined at the slice level; and determining whether to perform the filtering on the block boundary and performing the filtering, based on the set boundary strength and the first and second parameter.

9. A video decoding apparatus for decoding a sequence of pictures, comprising:

a boundary determination unit configured to determine at least one block boundary to which filtering is to be applied in a reconstructed image;

a strength setting unit configured to set a boundary strength of the block boundary based on prediction modes of two target luma blocks forming the block boundary among a plurality of prediction modes, wherein the plurality of prediction modes include an intra prediction mode, an intra block copy mode, and an inter prediction mode; and a filtering execution unit configured to calculate an average value of quantization parameters which are respectively applied to the target luma blocks, and derive a variable by adding the average value to an offset value derived from offset information decoded at a picture-level header or a sequence-level header that is a header which is referenced in common by the pictures belonging to the sequence, and determine whether to perform the filtering on the block boundary and perform the filtering, based on the set boundary strength and the variable, wherein the strength setting unit is configured to:

if at least one of the two target luma blocks are predicted by the intra prediction mode, set the boundary strength as a second value; and otherwise, if one of the two target luma blocks is predicted by the intra block copy mode and the other of the two target luma blocks is predicted by the inter prediction mode, set the boundary strength as a first value different from the second value.

10. The apparatus of claim 9, wherein the strength setting unit sets the boundary strength of the block boundary further considering preset conditions including:

a first condition that non-zero transform coefficients exist in one or more of target luma blocks forming the block boundary;

a second condition that the target luma blocks are predicted by referring to different reference pictures or using a different number of motion vectors; and a third condition that a difference in a horizontal axis direction component or a difference in a vertical axis direction component between the motion vectors used by the target luma blocks is greater than or equal to a preset threshold value, wherein when both of the two target luma blocks are not predicted by the intra prediction mode, the boundary strength is set to the first value if at least one of the preset conditions is satisfied.

11. The apparatus of claim 10, wherein a type of the block boundary includes a transform block boundary and a fundamental block boundary, and wherein the strength setting unit sets the boundary strength to the first value, when the block boundary corresponds to the transform block boundary and the target luma block satisfies the first condition, or when the block boundary corresponds to the fundamental block boundary and the target luma block satisfies the second condition or the third condition.

12. The apparatus of claim 10, wherein the preset conditions further include a fourth condition that the target luma blocks are predicted using the different number of motion vectors, wherein a type of the block boundary includes a transform block boundary, a prediction block boundary, and a sub-block boundary, and wherein the strength setting unit sets the boundary strength to the first value, when the block boundary corresponds to the transform block boundary and the target luma block satisfies the first condition, or when the block boundary corresponds to the prediction block boundary and the target luma block satisfies the second condition or the third condition, or when the block boundary corresponds to the sub-block boundary and the target luma block satisfies the third condition or the fourth condition.

13. The apparatus of claim 10, wherein a type of the block boundary includes a sub-block boundary, wherein the preset conditions include a fifth condition that a transform process is not applied to target luma blocks forming the block boundary, and wherein the strength setting unit sets the boundary strength to the first value, when the block boundary corresponds to the sub-block boundary and the target luma block satisfies the fifth condition.

14. The apparatus of claim 9, wherein the filtering execution unit is configured to derive a luma level by averaging values of a plurality of pixels included in the target luma blocks, wherein the offset value is determined based on the luma level and at least one threshold which is determined at the level of the sequence parameter set.

15. The apparatus of claim 9, wherein the type of the block boundary includes a sub-block boundary, and the strength setting unit sets the boundary strength to the first value when the block boundary corresponds to the sub-block boundary and the prediction modes of the target luma blocks are the IBC mode.

16. The apparatus of claim 9, wherein the filtering execution unit is configured to:

derive a first parameter for the filtering using the variable and a first offset determined at a slice level;

derive a second parameter for the filtering using the variable and a second offset determined at the slice level; and determine whether to perform the filtering on the block boundary and perform the filtering, based on the set boundary strength and the first and second parameter.

17. A non-transitory computer readable medium storing a bitstream generated by encoding a sequence of pictures by a block-based video encoding where a deblocking filtering is applied, the deblocking filtering comprising:

determining at least one block boundary to which filtering is to be applied in a reconstructed image;

setting a boundary strength of the block boundary based on prediction modes of two target luma blocks forming the block boundary among a plurality of prediction modes, wherein the plurality of prediction modes include an intra prediction mode, an intra block copy mode, and an inter prediction mode;

calculating an average value of quantization parameters which are respectively applied to the target luma blocks, and deriving a variable by adding the average value to an offset value derived based on offset information to be encoded at a picture-level header or a sequence-level header that is a header which is referenced in common by the pictures belonging to the sequence; and determining whether to perform the filtering on the block boundary and performing deblocking filtering on the block boundary, based on the set boundary strength and the variable, wherein the setting of the boundary strength comprises:
- if at least one of the two target blocks are predicted by the intra prediction mode, setting the boundary strength as a second value; and
- otherwise, if one of the two target blocks is predicted by the intra block copy mode and the other of the two target blocks is predicted by the inter prediction mode, setting the boundary strength as a first value different from the second value.

* * * * *